April 18, 1950     J. BURNHAM ET AL     2,504,178
ELECTRICAL CONDENSER
Filed April 28, 1947

JOHN BURNHAM
GILBERT E. GREEN
INVENTORS

BY
Arthur G. Connolly
ATTORNEY

UNITED STATES PATENT OFFICE 2,504,178

ELECTRICAL CONDENSER

John Burnham and Gilbert E. Green, Williamstown, Mass., assignors to Sprague Electric Company, North Adams, Mass., a corporation of Massachusetts Application April 28, 1947, Serial No. 744,456

5 Claims. (Cl. 175—315)

This invention relates to improved electrical condensers and more particularly refers to electrostatic and electrolytic condensers employing titanium and its alloys as electrodes.

Electrical condensers which employ thin oxide films as the dielectric insulation for the electrodes, are well known in the electrolytic condenser field. Aluminum is typical and uses an electrolytically formed oxide film as the dielectric. This aluminum oxide film has very high dielectric strength and can be produced in a fairly wide range of thicknesses, thus controlling the capacity and operating voltage of the condensers made therefrom.

Likewise, electrostatic condensers using an electrolytically formed film may be produced. As a typical example, reference may be made to U. S. Patent No. 2,408,910 in which aluminum is provided with a thin oxide film on its surface. A metal film is deposited in turn upon this oxide film, producing a second electrode, and an electrostatic condenser with high capacity per unit volume.

It is an object of this invention to produce new condensers possessing desirable characteristics. A further object is to produce new electrical condensers which occupy a very small volume per unit of electrical capacity. A still further object is to produce new electrolytic condensers which have long life and require very small volume per unit capacity. A still further object is to produce new electrostatic condensers and functional devices which use electrostatic condenser elements in their assembly. Additional objects will become apparent from the following description and claims.

These objects are attained in accordance with the present invention which is concerned with a condenser comprising two metal electrodes, one or both of which predominate in titanium and have an electrolytically formed oxide film on the surface. In a more restricted sense this invention is concerned with a condenser comprising two metal electrodes, one or both of which are predominantly titanium and are provided with an electrolytically formed surface film of titanium dioxide in rutile or anatase form. In one of its preferred embodiments this invention is concerned with an alternating current electrolytic condenser comprising two titanium metal electrodes, each of which is provided with an electrolytically formed surface film of titanium dioxide, the electrodes being separated by an electrolyte-saturated spacer material. In another of its preferred embodiments this invention is concerned with a condenser comprising two metal electrodes, one or both of which are made of an alloy of titanium and another polyvalent metal.

We have found that it is possible to electrolytically form novel dielectric films on the surface of titanium and alloys containing titanium. These dielectric films possess the advantage of exceedingly high dielectric constants, long life, even in the presence of electrolytes, high dielectric strength and good insulation resistance. The films may be produced in any desired thickness, within broad limits, for operation at different voltage levels. Titanium and alloys thereof which are provided with these dielectric films are very useful in the manufacture of electrolytic condensers, electrostatic condensers, artificial transmission lines, filters and the like.

The base metal is preferably titanium or an alloy of titanium with a polyvalent metal such as calcium, barium, strontium, cerium, beryllium, cobalt, magnesium, zinc or vanadium.

According to one of the limited and preferred embodiments of the invention substantially pure titanium is employed as the base metal. According to another preferred embodiment of the invention an alloy of titanium with one or more alkaline earth metals is employed. This includes alloys of titanium and barium or strontium.

The base electrode metal may be in any desired form, for example, a flexible or rigid sheet, a pressed or compacted powder, or a sprayed mass. In thin sheets the metal is tough and flexible and may be rolled in a convolute mannner as is conventional in the manufacture of so-called rolled paper condensers. The metal may be in the form of a flexible wire or rod of any desired cross-section. Pressed or compacted powders also are useful in obtaining a maximum surface area per unit volume.

The method of electrolytically forming the film depends somewhat upon the voltage to which the dielectric is to be subjected, the type of service to be encountered and related factors. It is generally formed by making the titanium or its alloy the anode in an electrolytic cell containing a forming agent such as oxalic acid, boric acid, tartaric citric acid, etc. Generally aqueous solutions of these forming agents or ionogens are used, but other media may be employed. The system may be subjected to any desired voltage. Among other things, the thickness of the dielectric film is a function of the forming voltage in the electrolytic cell. For many applications low formation voltages are sufficient. However, voltages of 500 volts or higher may be used if desired, resulting in thicker dielectric films.

The electrode thus produced, with its thin dielectric film, is useful in a number of constructions which are best described in conjunction with the attached drawing in which.

Figure 1:
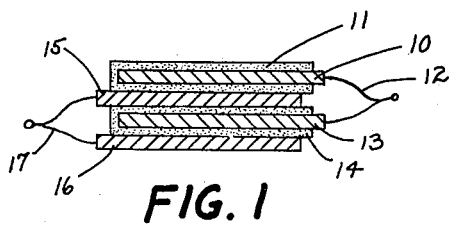
Figure 1 represents a cross-section of one of the condensers of the invention.

Referring more specifically to Figure 1, 10 and 13 are titanium electrodes upon which are electrolytically formed thin oxide films 11 and 14 respectively. If the electrodes 10 and 13 are of substantially pure titanium, these oxide films will consist of substantially pure titanium dioxide. Disposed between electrodes 10 and 13 are metal electrodes 15 and 16 which are of lead, copper, aluminum or other metal or alloys. The condenser thus produced is effectively a stacked unit with terminal 12 connected to electrodes 10 and 13, and terminal 17 connected to electrodes 15 and 16. A condenser of this type may be stacked as shown, preferably under some pressure, or it may be rolled from long thin sheets. If so desired, an outer casing of insulating material may be cast or molded about the condenser section shown.

Figure 2:
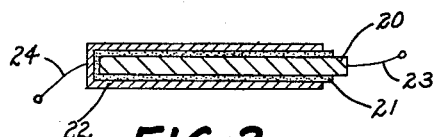
Figure 2 represents a cross-section of another condenser of the invention.

Figure 2 shows a unitary condenser assembly in which titanium or titanium alloy electrode 20 is provided with a thin electrolytically formed oxide film 21 over its surface except at the terminal connection point. Upon this refractory oxide film is deposited metal electrode 22, encompassing the major portion of the outer surface of the dielectric film 21. This metal layer 22 serves as an electrode, and may be produced by firing on a silver lacquer, spraying the metal in the well-known manner, or by other means known in the art. The thickness of the metal film is dependent upon the conductivity of the metal, the current load to be carried, etc. A terminal wire 23 is connected to electrode 20 and terminal wire 24 is connected to the outer electrode 22. If so desired, this unitary assembly may be coated with an insulating lacquer, wax, resin, etc. It may be produced from a single sheet of electrode, a short length of wire, or a long roll of the metal. Multiple assemblies of these units may be made by stacking the individual units.

Figure 3:
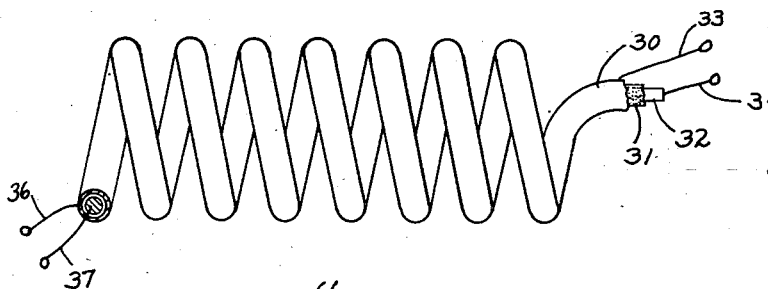
Figure 3 represents a side view of a partially cut-away transmission line of the invention.

Figure 3 shows another novel condenser possessing transmission line characteristics. In this figure, the coil consists of the inner titanium conductor 32, a thin electrolytically formed dielectric film 31 thereon, and an outer metallic coating 30 similar to that described in Figure 2. Terminal elements may be connected to both ends of the coil: e. g., terminal wire 36 to the outer sheath 30 and inner terminal 37 to the titanium wire 32 at one end of the coil, and a similar connection of terminal 33 to the outer metal coating and terminal 34 to the inner titanium electrode. This coaxial assembly may be operated as a filter unit, an artificial transmission line, or simply as a condenser. By varying the dielectric thickness, the length of wire, the diameter, and number of turns in the coil, as well as the number and position of the terminals, a surprisingly wide and useful range of frequency characteristics may be achieved.

Figure 4:
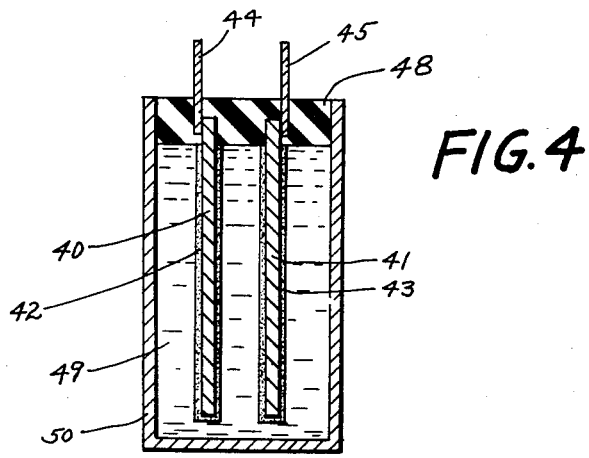
Figure 4 represents a cross-section of a wet electrolytic condenser.

Figure 4 shows a cross-section of a wet electrolytic condenser utilizing the novel electrodes of the invention. Two titanium electrodes 40 and 41 are shown attached to terminal elements 44 and 45 respectively by means of rivets, welding or other means. Unless the terminal tabs are of a film-forming metal such as titanium, they should not be exposed to electrolyte 49. Electrodes 40 and 41 are provided with electrolytically formed dielectric films 42 and 43, which also preferably cover those portions of electrodes which are exposed to the electrolyte 49 within the casing. Otherwise a high leakage current or even a short circuit may occur. Terminals 44 and 45 and the two electrodes are embedded in closure material 48 which may be rubber or some other suitable insulating material. Container 50 must be impervious to the electrolyte and may be either metallic or non-metallic in character. If only one electrode is employed, it is possible to utilize the metallic container as the cathode of the condenser for direct current applications. Electrolyte 49 is a liquid or semi-liquid conductor consisting, for example, of an acid or a salt of an acid dissolved in ethylene glycol or similar materials.

Figure 5:
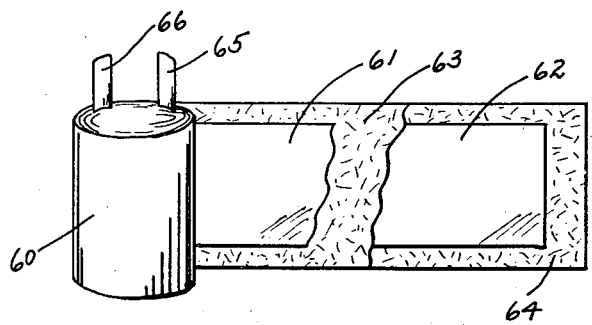
Figure 5 represents a partially unwound condenser of the dry electrolytic type.

Figure 5 represents a partially unwound dry electrolytic condenser produced in accordance with the invention. Electrodes 61 and 62 are titanium or titanium alloy sheets upon which are formed thin dielectric films of titanium dioxide or modifications thereof. The electrodes are separated from each other by electrolyte-saturated spacing material 63 and 64. Terminal tabs 66 and 65 of film-forming metal are connected to the electrodes in the usual manner. The assembly is wound in a roll form 60, which may be placed in a container to prevent evaporation of the lower boiling constituents of the electrolyte.

If desired, the titanium or titanium alloy may be chemically etched with very strong acids such as hydrofluoric acid, or may be electrochemically etched, to increase the surface area before the formation step. In this way it is possible to increase the total electrolytic capacity per unit volume tremendously, providing a condenser of exceptional characteristics. However, titanium is very resistant to etching and corrosion and for this reason it is possible to employ electrolytes, such as solutions of alkali and alkaline chlorides, earth nitrates, in the manufacture of the condensers. Heretofore, in the conventional aluminum oxide electrolyte condensers the selection of electrolyte was a very critical task since chlorides and the like corroded the aluminum base extensively to produce poor condenser assemblies.

While the invention has been described with respect to the formation of electrolytic oxide films it is possible to form these dielectric films by purely chemical means, such as by use of chromic acid, sulfuric acid and the like, or by exposure of the metal surfaces to oxidizing gases.

As a specific example of the characteristics of our condensers, a sheet of substantially pure titanium, .0034" thick with a total area of one square inch, was formed in an electrolyte containing 120 grams of boric acid per liter of water. The voltage was increased to 80 volts. Thereafter, the formed electrode was placed in a water solution of 50 grams of boric acid and 5 cc. of 28% $NH_4OH$ in one liter of water. Nickel cathodes were placed on each side of the titanium anode. Its capacity was 115 microfarads measured at 60 cycles A. C. The dielectric film produced appears to be the anatase or rutile form of titanium dioxide, with a dielectric constant in the neighborhood of 100. At 120 cycles the capacity was 83 microfarads and at 1000 cycles was 75 microfarads.

It is contemplated that by means of the foregoing instructions it is possible to produce films with a dielectric constant of 1000 or more by alloying the titanium with other polyvalent metals, particularly the alkaline earth metals. The film thus produced is a metal titanate. For example, an alloy consisting of about 74% barium and 26% titanium may be treated to give a barium titanate oxide film, which possesses a very high dielectric constant.

Since the titanium base metal is flexible and since the film is on the order of .0001" in thickness it is possible to roll the formed metal into coil form thus saving considerable volume over the conventional titanium dioxide condensers, which employ cylinders or fillers of titanium dioxide of .005" or greater in thickness. Thus not only is the capacity per unit area greatly increased but also it is possible to produce condensers in the minimum volume possible. The dielectric films produced in accordance with the invention are less than .001" in thickness and generally .0005" in thickness and are reasonably flexible.

As many apparently widely different embodiments of this invention may be made without departing from the spirit and scope hereof, it is to be understood that the invention is not limited to the specific embodiments hereof except as defined in the appended claims.

What we claim is:

1. A condenser comprising two metal electrodes, at least one of which is composed of an alloy of titanium and an alkaline earth metal, said electrode having formed on its surface a film of a titanate of the alkaline earth metal.

2. A condenser comprising two metal electrodes, one of which is composed of an alloy of titanium and an alkaline earth metal, said electrode having on its surface a chemically formed film of a titanate of the alkaline earth metal.

3. An electrolytic condenser comprising two metal electrodes, one of which is composed of an alloy of titanium and barium and has an electrolytically formed surface film of barium titanate.

4. A condenser comprising two metal electrodes, one of which is composed of an alloy of titanium and an alkaline earth metal, said electrode having on its surface an electrolytically formed film of a titanate of the alkaline earth metal.

5. An electrolytic condenser comprising two metal electrodes at least one of which is an alkaline earth metal alloy of titanium, said electrode having on its surface a titanate film formed by the surface oxidation of said alloy, the electrodes being separated from each other by spacer material impregnated with electrolyte.

JOHN BURNHAM.
GILBERT E. GREEN.

REFERENCES CITED

The following references are of record in the file of this patent:

UNITED STATES PATENTS

| Number | Name | Date |
| --- | --- | --- |
| 1,344,752 | Chubb | June 29, 1920 |
| 1,684,684 | Read | Sept. 18, 1928 |
| 1,925,307 | De Boer | Sept. 5, 1933 |
| 1,935,860 | Robinson | Nov. 21, 1933 |
| 2,377,910 | Wainer | June 12, 1945 |
| 2,399,082 | Wainer | Apr. 23, 1946 |
| 2,408,910 | Burnham | Oct. 8, 1946 |